United States Patent
Kumagai et al.

(10) Patent No.: US 11,052,789 B2
(45) Date of Patent: Jul. 6, 2021

(54) SEAT SLIDE DEVICE FOR VEHICLES

(71) Applicant: SHIROKI CORPORATION, Fujisawa (JP)

(72) Inventors: Koji Kumagai, Kariya (JP); Takanori Sato, Kariya (JP); Yuto Kogune, Kariya (JP)

(73) Assignee: SHIROKI CORPORATION, Fujisawa (JP)

( * ) Notice: Subject to any disclaimer, the term of this patent is extended or adjusted under 35 U.S.C. 154(b) by 0 days.

(21) Appl. No.: 16/647,759

(22) PCT Filed: Dec. 7, 2018

(86) PCT No.: PCT/JP2018/045072
§ 371 (c)(1),
(2) Date: Mar. 16, 2020

(87) PCT Pub. No.: WO2019/131056
PCT Pub. Date: Jul. 4, 2019

(65) Prior Publication Data
US 2020/0276919 A1    Sep. 3, 2020

(30) Foreign Application Priority Data
Dec. 27, 2017    (JP) .............................. JP2017-251710

(51) Int. Cl.
    *B60N 2/08*    (2006.01)
(52) U.S. Cl.
    CPC .................................. *B60N 2/0875* (2013.01)
(58) Field of Classification Search
    CPC ........ B60N 2/0875; B60N 2/085; B60N 2/08; B60N 2/0818; B60N 2/0881
    See application file for complete search history.

(56) References Cited

U.S. PATENT DOCUMENTS

| | | | |
|---|---|---|---|
| 2015/0306979 A1* | 10/2015 | Hayashi | B60N 2/0705 248/429 |
| 2017/0341535 A1* | 11/2017 | Taniguchi | B60N 2/0875 |
| 2018/0257514 A1* | 9/2018 | Taniguchi | B60N 2/085 |

FOREIGN PATENT DOCUMENTS

| | | | |
|---|---|---|---|
| JP | 2001010377 A | 1/2001 | |
| JP | 2016094102 A | 5/2016 | |

(Continued)

OTHER PUBLICATIONS

International Search Report (with English Translation) and Written Opinion issued in corresponding International Patent Application No. PCT/JP2018/045072, 8 pages (Feb. 19, 2019).

*Primary Examiner* — Amy J. Sterling
(74) *Attorney, Agent, or Firm* — Buchanan Ingersoll & Rooney PC

(57) ABSTRACT

A vehicle seat slide device is capable of improving an operational feeling of an unlocking member. The vehicle seat slide device includes: a lower rail; an upper rail that is movably attached to the lower rail and supports a seat; a lock spring that is attached to the upper rail, has a lock part engaging with the lower rail to restrict movement of the upper rail, and is formed in an annular shape; and an unlocking member that is attached to the upper rail and displaces the lock spring to disengage the lock spring and the lower rail to clear the restriction on the movement of the upper rail. The unlocking member is positioned more inside than the lock spring as seen in both a longitudinal direction and a width direction of the upper rail.

3 Claims, 8 Drawing Sheets

(56) References Cited

FOREIGN PATENT DOCUMENTS

| | | |
|---|---|---|
| JP | 2017024578 A | 2/2017 |
| JP | 2017210137 A | 11/2017 |

\* cited by examiner

ONE END SIDE ⟷ THE OTHER END SIDE

SEAT SLIDE DEVICE FOR VEHICLES

TECHNICAL FIELD

The present invention relates to relates to a vehicle seat slide device.

BACKGROUND ART

Patent Literature 1 describes a vehicle seat slide device 100 that includes a lower rail 102 and an upper rail 103 as illustrated in FIG. 12. The upper rail 103 is movably attached to the lower rail 102 and supports a seat. The vehicle seat slide device 100 also includes a lock spring 104. The lock spring 104 is attached to the upper rail 103 and engages with the lower rail 102 to restrict movement of the upper rail 103. There is arranged in the upper rail 103, a lock lever 105 as an unlocking member along a longitudinal direction of the upper rail 103. A loop handle 106 is attached to one end side of the lock lever 105 in a state of protruding from a longitudinal end of the upper rail 103. When a passenger pulls up the loop handle 106, the one end side of the lock lever 105 ascends and the other end side of the lock lever 105 descends pivoting on an upper central portion of the lock lever 105. When the other end side of the lock lever 105 presses down the lock spring 104, the lock spring 104 and the lower rail 102 are disengaged to clear the restriction on movement of the upper rail 103.

CITATION LIST

Patent Literature

Patent Literature 1: JP2017-24578 A

SUMMARY OF THE INVENTION

Problems to be Solved by the Invention

For a passenger to obtain a favorable operational feeling of the loop handle 106 in the vehicle seat slide device 100 described in Patent Literature 1 and the like, the loop handle 106 desirably has a sufficient motion range. However, since the lock lever 105 is displaced in the vertical direction of the upper rail 103, the motion range in the upper rail 103 is limited. Along with this, the vertical motion range of the loop handle 106 attached to the lock lever 105 is also limited, which makes it difficult to obtain a favorable operational feeling.

Solution to the Problems

A vehicle seat slide device provided to solve the problem includes: a lower rail; an upper rail that is movably attached to the lower rail and supports a seat; a lock spring that is attached to the upper rail, has a lock part engaging with the lower rail to restrict movement of the upper rail, and is formed in an annular shape; and an unlocking member that is attached to the upper rail and displaces the lock spring to disengage the lock spring and the lower rail to clear the restriction on the movement of the upper rail. The unlocking member is positioned more inside than the lock spring as seen in both a longitudinal direction and a width direction of the upper rail.

The unlocking member is positioned more inside than the lock spring as seen in both the longitudinal direction and the width direction of the upper rail, which makes it possible to widen the motion range of the unlocking member taking advantage of a longitudinal space of the upper rail. Widening the motion range of the unlocking member makes it possible to improve an operational feeling of the unlocking member. In addition, it is possible to arrange the unlocking member with efficient use of the internal space of the lock spring.

In the vehicle seat slide device, the unlocking member is preferably positioned to straddle the lock spring as seen in the vertical direction of the upper rail. According to this configuration, it is possible to widen the vertical motion range of the unlocking member necessary for displacement of the lock spring, thereby improving an operational feeling of the unlocking member.

In the vehicle seat slide device, the unlocking members preferably attached more backward than the lock part of the lock spring as seen in a front-back direction of the vehicle. According to this configuration, it is possible to operate the unlocking member with efficiency from the backward side of the seat.

Effects of the Invention

According to the vehicle seat slide device of the present invention, it is possible to improve an operational feeling of the unlocking member.

DESCRIPTION OF THE EMBODIMENTS

An embodiment of a vehicle seat slide device will be described.

Figure 1:
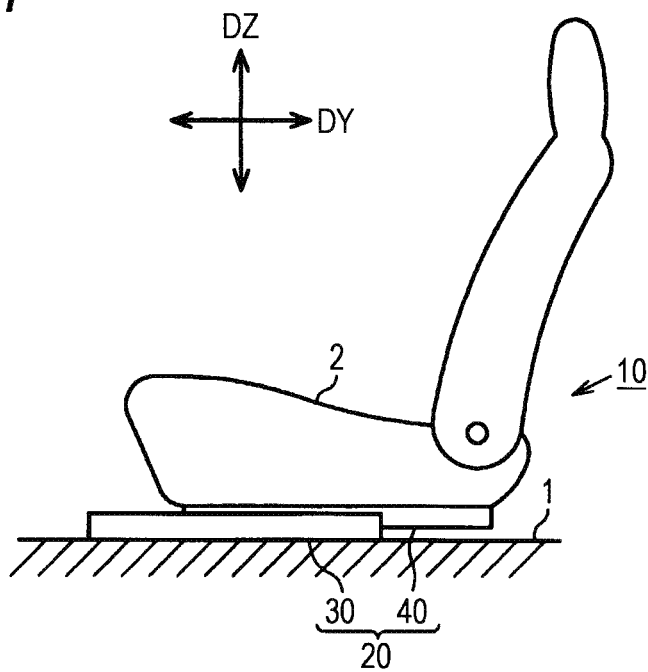
FIG. 1 is a side view of a vehicle seat slide device equipped with a seat.

As shown in FIG. 1, a vehicle seat slide device 10 is attached to a vehicle floor 1 equipped with a seat 2. The vehicle seat slide device 10 is capable of moving the seat 2 in a front-back direction of the vehicle and fixing the seat 2 at a predetermined position.

Figure 2:
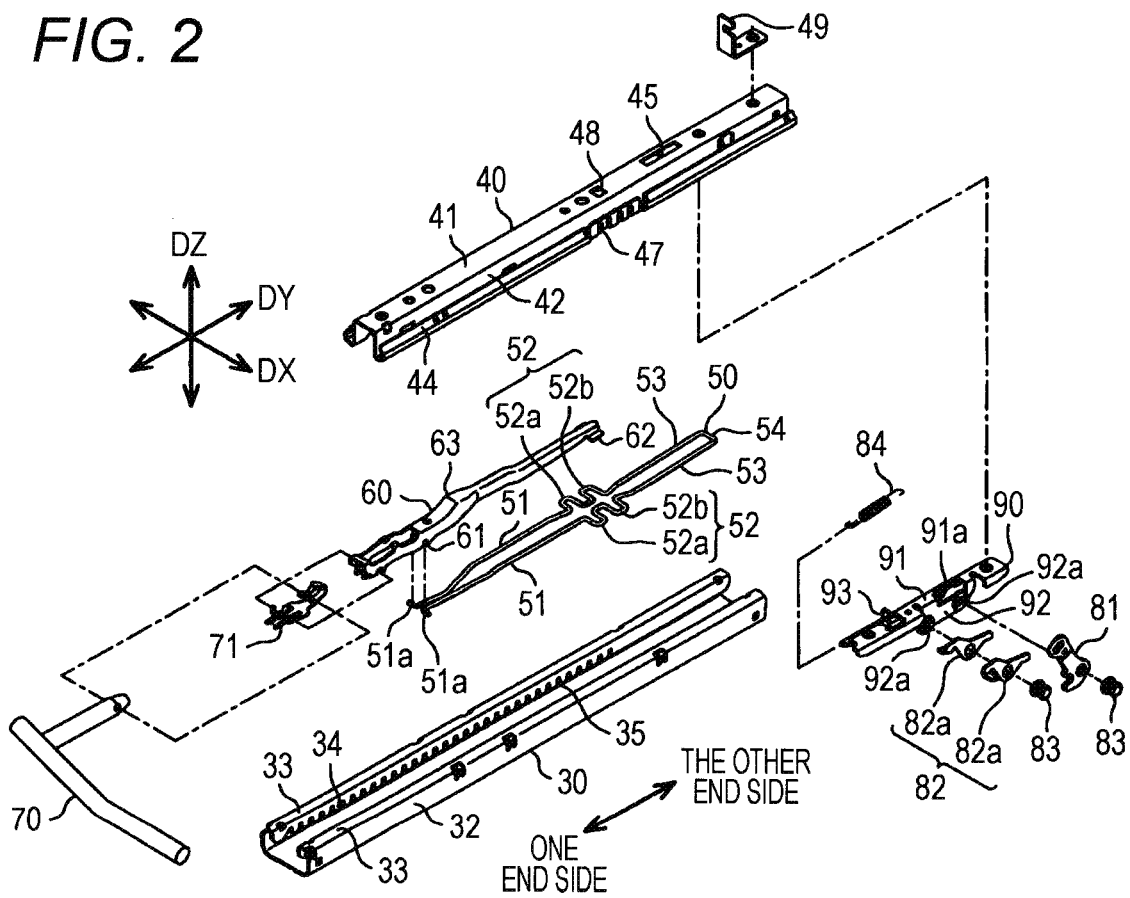
FIG. 2 is an exploded perspective view of the vehicle seat slide device.
Figure 3:
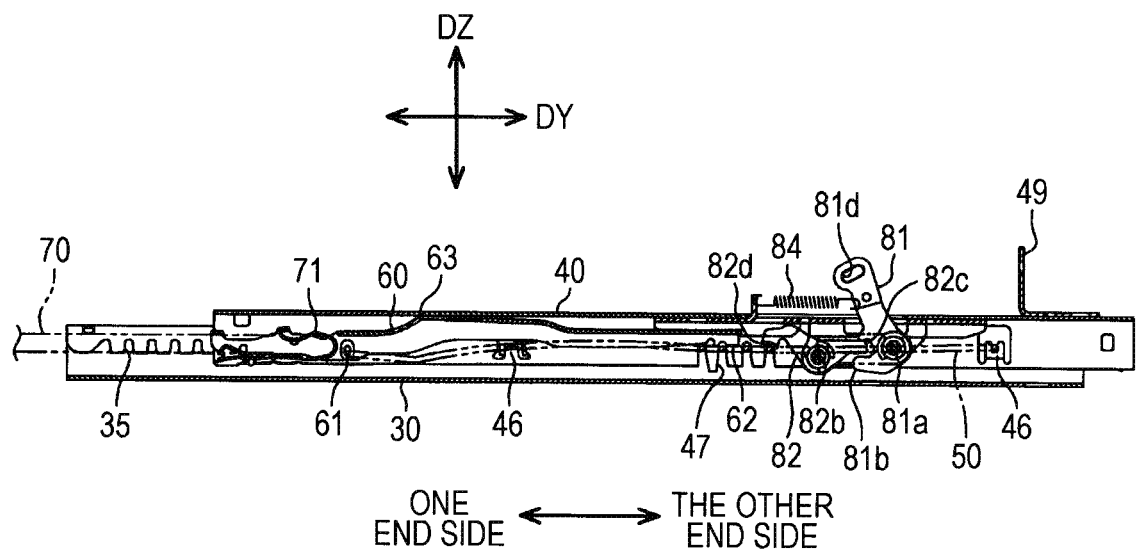
FIG. 3 is a side view of the vehicle seat slide device.

As shown in FIGS. 1 to 3, the vehicle seat slide device 10 includes slide rails 20. The slide rails 20 include lower rails 30 attached to the vehicle floor 1 and upper rails 40 that are movably attached to the lower rails 30 to support the seat 2. A pair of lower rails 30 and a pair of upper rails 40 are provided. In a state where the slide rails 20 are installed on the vehicle floor 1, a direction along the front-back direction of the vehicle will be called "front-back direction DY", a direction along a width direction of the vehicle will be called "width direction DX", and a direction along a vertical direction of the vehicle will be called "vertical direction DZ". The front-back direction DY of the vehicle seat slide device 10 coincides with the "longitudinal direction" of the lower rails 30 and the upper rails 40 of the vehicle seat slide device 10. The vertical direction DZ is a direction orthogonal to both the front-back direction DY and the width direction DX.

A configuration of the slide rails 20 will be described.

Figure 4:
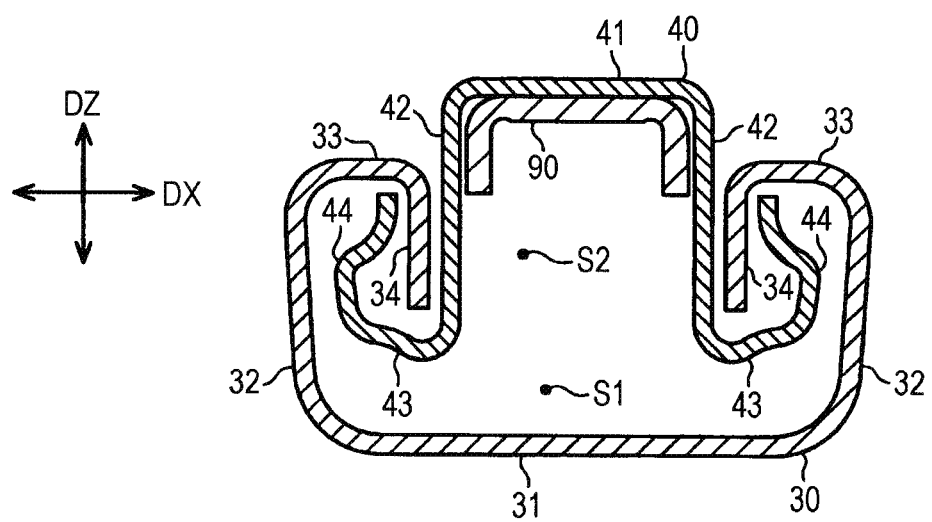
FIG. 4 is a schematic view of the vehicle seat slide device seen from a front-back direction.

As shown in FIG. 4, each of the lower rails 30 includes a plate-like bottom wall part 31 that is fixed to the vehicle floor 1. There is provided a pair of side wall parts 32 extending upward along the vertical direction DZ on both ends of the bottom wall part 31 as seen in the width direction DX. There is provided a pair of lateral wall parts 33 extending inward the bottom wall part 31 as seen in the width direction DX at an end of the pair of side wall parts 32 opposite to the bottom wall part 31. There is provided a pair of vertical wall parts 34 extending downward along the vertical direction DZ at an end of the pair of lateral wall parts 33 opposite to the side wall parts 32. The pair of vertical wall parts 34 is spaced so that there is formed a gap between the vertical wall parts 34. Each of the lower rails 30 has an internal space S1 surrounded by the bottom wall part 31, the pair of side wall parts 32, the pair of lateral wall parts 33, and the pair of vertical wall parts 34. The internal space S1 communicates with an external space via the gap between the vertical wall parts 34 in the vertical direction DZ.

As shown in FIGS. 2 and 3, the vertical wall parts 34 of the lower rails 30 have first cuts 35 extending from a lower end upward in the vertical direction DZ. The plurality of first cuts 35 is formed at equal intervals along the front-back direction DY of the lower rails 30. The lock spring 50 engages with both the first cuts 35 and second cuts 47 in the upper rails 40 described later to restrict the movement of the upper rails 40.

As shown in FIG. 4, each of the upper rails 40 includes a plate-like top wall par 41 that extends in parallel to the vehicle floor 1. There is provided a pair of side wall parts 42 extending downward along the vertical direction DZ at both ends of the top wall part 41 as seen in the width direction DX. There is provided a pair of lateral wall parts 43 extending toward outside of the top wall part 41 as seen in the width direction DX at an end of the pair of side wall parts 42 opposite to the top wall part 41. There is provided a pair of vertical wall parts 44 extending upward along the vertical direction DZ at an end of the pair of lateral wall parts 43 opposite to the side wall parts 42. The upper rail 40 has an internal space S2 surrounded by the top wall part 41 and the pair of side wall parts 42.

As shown in FIG. 2, the top wall part 41 of the upper rail 40 has an insertion hole 45 into which an unlocking member 80 described later is inserted and an insertion hole 48 into which a third wall part 93 of a reinforcement member 90 is inserted. A wire support tool 49 is attached to the top wall part 41 of the upper rail 40 to support a wire 85 for operating the unlocking member 80.

As shown in FIGS. 2 and 3, the vertical wall parts 44, the lateral wall parts 43, and the side wall parts 42 in the longitudinal center of the upper rail 40 have second cuts 47 extending upward from a lower end in the vertical direction DZ. The four second cuts 47 are formed at equal intervals along the vertical direction DY of the upper rail 40. The total eight second cuts 47 are formed at positions facing each other with respect to the pair of side wall parts 42. The shape of the second cuts 47 and the interval between the second cuts 47 are set to be substantially equal to those of the first cuts 35 provided in the lower rails 30. The second cuts 47 serve as engaged parts with which curved parts 52 of the lock spring 50 described later engage.

As shown in FIG. 4, the upper rail 40 is slidably attached to the lower rail 30 in a state in which the pair of lateral wall parts 43 is inserted into the internal space S1 of the lower rail 30 through the gap formed between the pair of vertical wall parts 34 of the lower rail 30. In a state where the upper rail 40 is attached to the lower rail 30, arranging the lateral wall parts 43 of the upper rail 40 and the lateral wall parts 33 of the lower rail 30 to overlap each other in the vertical direction DZ suppresses the upper rail 40 from being removing from the lower rail 30 in the vertical direction DZ. In addition, in a state where the first cuts 35 of the lower rail 30 and the second cuts 47 of the upper rail 40 overlap together, engaging the lock spring 50 with both the cuts makes it possible to restrict the movement of the upper rail 40.

Figure 5A:
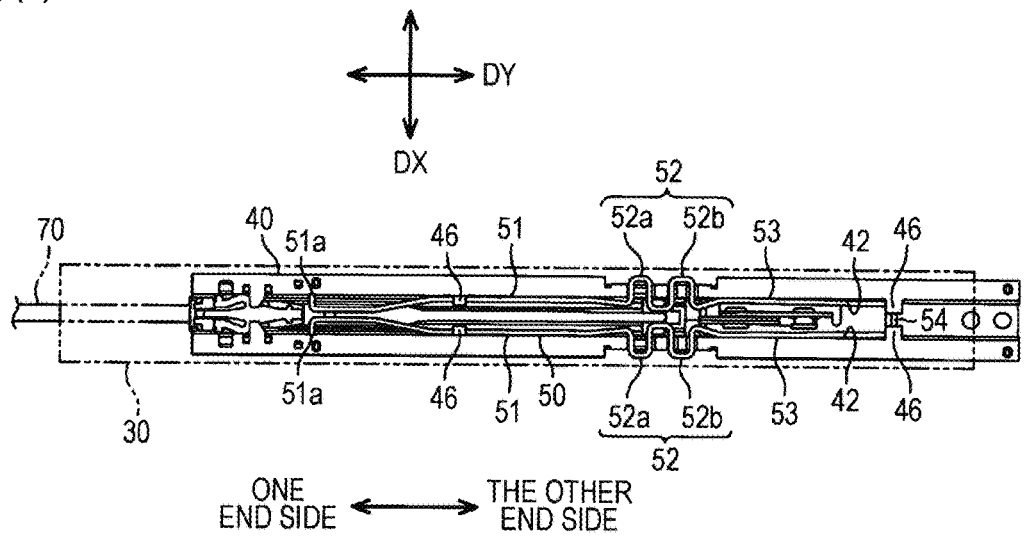
FIG. 5(*a*) is a bottom view of the vehicle seat slide device, and FIG. 5(*b*) is a partial enlarged view of FIG. 5(*a*).

As shown in FIG. 5(a), the pair of side wall parts 42 of the upper rail 40 has claws 46 formed by folding inside portions of the side wall parts 42 in the width direction DX at two each places on one and the other end sides of the upper rail 40 (total four places) as seen in the front-back direction DY. When the lock spring 50 is supported on the claws 46, the lock spring 50 is attached to the internal space S2 of the upper rail 40.

A configuration of the lock spring 50 will be described.

As shown in FIGS. 2 and 5(a), the lock spring 50 is formed in an elongated annular shape by folding a flexible linear material. When being attached to the internal space S2 of the upper rail 40, the lock spring 50 has a pair of first extension parts 51 extending along the pair of side wall parts 42 of the upper rail 40 and a pair of curved parts 52 curved outward in the width direction DX on the other end side of the first extension parts 51. In addition, the lock spring 50 has on the other end side of the curved parts 52, a pair of second extension parts 53 extending along the pair of side wall parts 42 of the upper rail 40 and a connection part 54 connecting between the other end sides of the second extension parts 53. As a whole, the lock spring 50 is configured such that the curved parts 52 are positioned at a substantially middle part of the lock spring 50 as seen in the longitudinal direction. Each of the curved parts 52 of the lock spring 50 is shaped to protrude outward in the width direction DX from two different places as seen in the front-back direction DY, and includes a first curved portion 52a on one end side and a second curved portion 52b on the other end side.

The pair of first extension parts 51 of the lock spring 50 is configured to come closer to each other with increasing proximity to the one end side. The ends of the pair of first extension parts 51 on the one end side each have bent portions 51a that bend outward in the width direction DX. The bent portions 51a are configured to engage with a concave part 61 of a lock lever 60 described later. There is a gap between the bent portions 51*a* so that the lock spring 50 has an annular shape that is opened between the bent portions 51*a*.

Figure 5B:
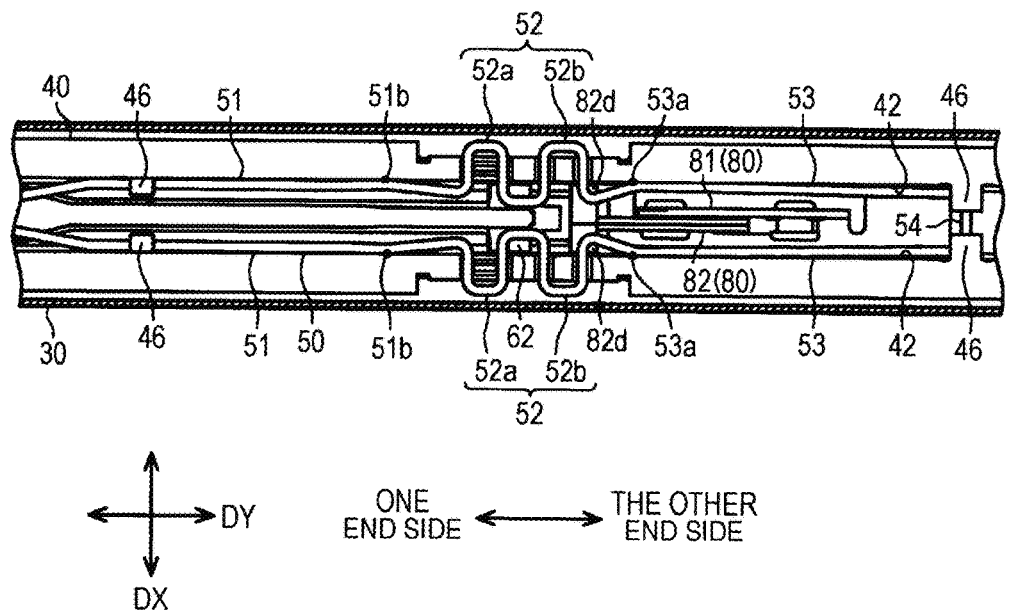

As shown in FIG. 5(*b*), the pair of first extension parts 51 is configured to separate from each other with increasing proximity to the other end side. The pair of first extension parts 51 has first separation portions 51*b* formed near a place of connection with the curved parts 52 where the pair of first extension parts 51 is most separated from each other. That is, the pair of first extension parts 51 is configured to be most separated from each other at the first separation portions 51*b* along the width direction DX.

The pair of second extension parts 53 is configured to separate from each other with increasing proximity to the one end side. The pair of second extension parts 53 has second separation portions 53*a* formed near a place of connection with the curved parts 52 where the pair of second extension parts 53 is most separated from each other. That is, the pair of second extension parts 53 is configured to be most separated from each other at the second separation portions 53*a* along the width direction DX.

As shown in FIGS. 5(*a*) and 5(*b*), the lock spring 50 is attached to the internal space S2 of the upper rail 40 in a state where the first extension parts 51 and the connection part 54 of the lock spring 50 are supported by the claws 46 at the pair of side wall parts 42 of the upper rail 40. The lock spring 50 is supported such that the curved parts 52 are positioned in a substantially middle of the place supported by the claws 46 on the one end side and the other end side as seen in the longitudinal direction. In this state, the first separation portions 51*b* and the second separation portions 53*a* of the lock spring 50 are in point contact with the pair of side wall parts 42 of the upper rail 40 while pressing the side wall parts 42. That is, the first separation portions 51*b* and the second separation portions 53*a* of the lock spring 50 serve as first contact parts and second contact parts. The places where the lock spring 50 and the pair of side wall parts 42 of the upper rail 40 are in point contact with each other are positioned closer to the curved part 52 side of the lock spring 50 than the one and other ends of the lock spring 50. The first curved portions 52*a* and the second curved portions 52*b* of the curved parts 52 of the lock spring 50 engage with both the second cuts 47 of the upper rail 40 and the first cuts 35 of the lower rail 30, thereby to restrict the movement of the upper rail 40. Thus, the curved parts 52 of the lock spring 50 serve as lock parts. Bending the lock spring 50 pivoting on the places supported by the claws 46 makes it possible to displace (press down) the curved parts 52 positioned in the longitudinal middle part side of the lock spring 50 in the vertical direction DZ.

A configuration of the lock lever 60 will be described.

As shown in FIG. 2, the lock lever 60 is formed in an elongated shape and is attached between the top wall part 41 of the upper rail 40 and the lock spring 50 in the internal space S2 of the upper rail 40. An attachment member 71 is attached to one end side of the lock lever 60 for connection of a loop handle 70 described later. That is, the loop handle 70 is attached to the lock lever 60 via the attachment member 71. The lock lever 60 has a pressing part 62 formed on the other end side to displace the curved parts 52 of the lock spring 50. The lock lever 60 has a convex part 63 serving as a pivot of the lock lever 60 by abutment with the inside of the top wall part 41 of the upper rail 40, on a top of the longitudinal middle part of the lock lever 60. The lock lever 60 has a concave part 61 to engage with the bent portions 51*a* of the lock spring 50 at a lower part of the lock lever 60 on the one end side.

An unlocking mechanism by the lock lever 60 will be described.

When the loop handle 70 attached to the lock lever 60 is pulled up, the one end side of the lock lever 60 ascends via the attachment member 71. Along with this, the other end side of the lock lever 60 descends pivoting on the top of the middle part of the lock lever 60, and the pressing part 62 of the lock lever 60 displaces the curved parts 52 of the lock spring 50. The lock spring 50 is bent and the curved parts 52 of the lock spring 50 is displaced so that the curved parts 52 of the lock spring 50 disengage from the second cuts 47 of the upper rail 40 and the first cuts 35 of the lower rail 30. Accordingly, the restriction on movement of the upper rail 40 is cleared. The lock lever 60 can clear the restriction on the movement of the upper rail 40 from the forward side of the vehicle, and thus the lock lever 60 serves as a forward unlocking member.

A configuration of the unlocking member 80 will be described.

Figure 6:
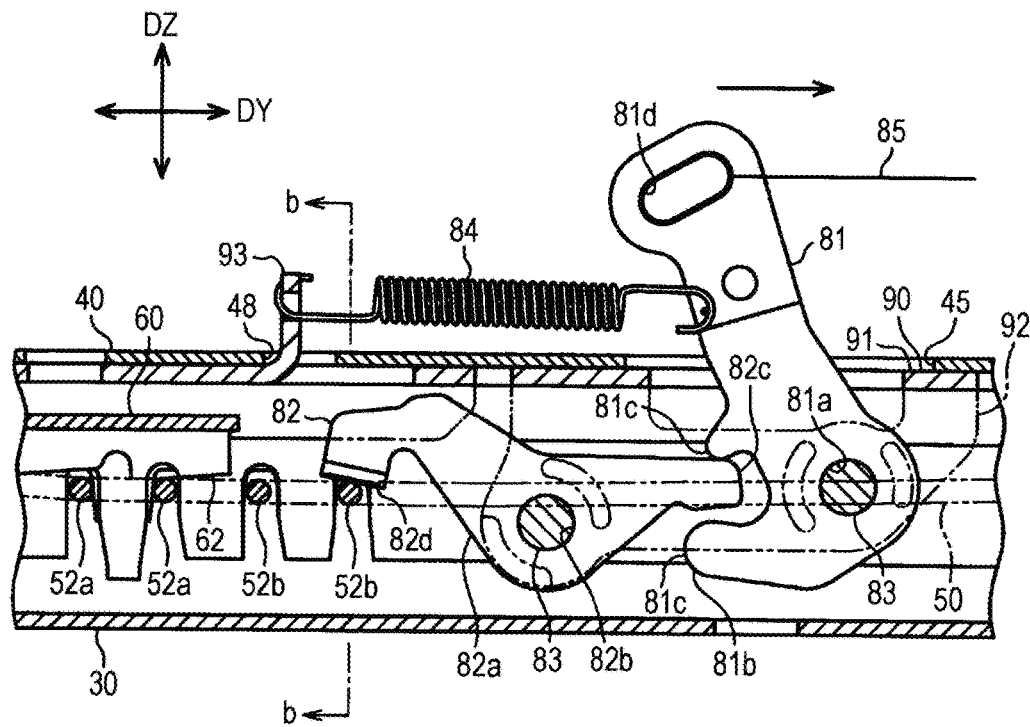
FIG. 6(*a*) is a side view of an unlocking member, and FIG. 6(*b*) is a cross-sectional view of FIG. 6(*a*) taken along line h-h.
Figure 6:
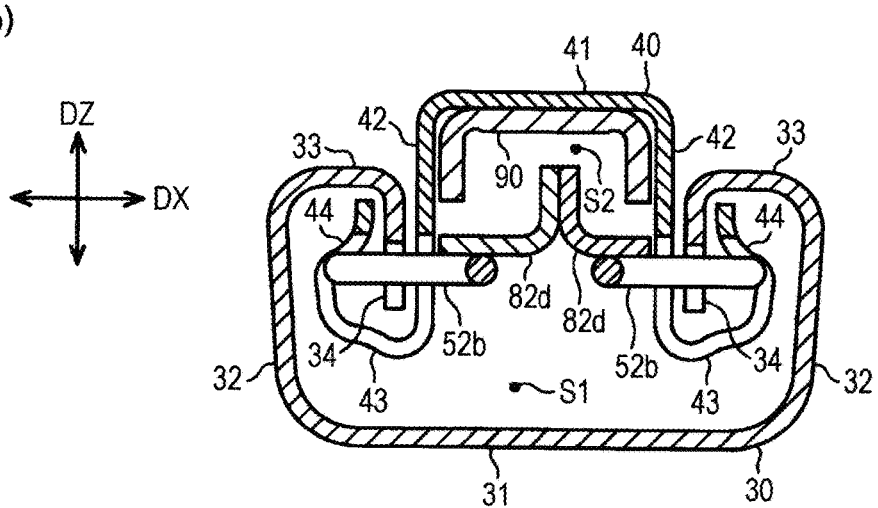

As shown in FIG. 6(*a*), the unlocking member 80 includes a long plate-like first member 81 and a long plate-like second member 82. The second member 82 is formed by stacking two plate members 82*a*. The first member 81 has an axis hole 81*a* in which an axial member 83 is inserted at one longitudinal end and a first engagement portion 81*b* that engages with the second member 82. The first engagement portion 81*b* of the first member 81 is formed by convex portions 81*c* protruding along a short direction at two different places of the first member 81 as seen in the longitudinal direction. The convex portions 81*c* each have a semicircular leading end, and a second engagement portion 82*c* of the second member 82 engages between the two convex portions 81*c*. The first member 81 has a through hole 81*d* for attachment of the wire 85 operating the first member 81 at the other longitudinal end of the first member 81.

As shown in FIG. 6(*a*), the second member 82 is formed in a "substantially dog-leg shape." The "substantially dog-leg shape" has an axis hole 82*b* into which the axial member 83 is inserted at a center part. One longitudinal end of the second member 82 is formed as the second engagement portion 82*c* that engages with the first engagement portion 81*b* of the first member 81. The second member 82 has a pressing portion 82*d* that displaces the curved parts 52 of the lock spring 50 at the other longitudinal end.

As shown in FIG. 6(*b*), the pressing portion 82*d* of the second member 82 is formed by folding the other longitudinal ends of the two plate members 82*a* constituting the second member 82 in directions that separate from each other in the thickness direction (width direction DX)".

As shown in FIG. 2, the unlocking member 80 is attached to the reinforcement member 90 installed in the internal space S2 of the upper rail 40.

A configuration of the reinforcement member 90 will be described.

As shown in FIGS. 2 and 4, the reinforcement member 90 is formed in an elongated shape and is attached inside the top wall part 41 and the side wall parts 42 of the upper rail 40. The reinforcement member 90 is attached inside the top wall part 41 and the side wall parts 42 of the upper rail 40 where the second cuts 47 are formed by welding or caulking to enhance the strength of the places on the upper rail 40 where the second cuts 47 are formed. That is, the reinforcement member 90 is positioned around the second cuts 47 to overlap at least the second cuts 47 as seen in the width direction of the upper rail 40.

As shown in FIGS. 8(*a*) to 8(*d*), the reinforcement member 90 has a first wall part 91 that is curved along the shape of the top wall part 41 and the side wall parts 42 of the upper rail 40 and a second wall part 92 that is formed by cutting and pulling down a portion of the first wall part 91 in the vertical direction DZ. The second wall part 92 extends in the width direction DX from the middle portion of the first wall part 91 toward under the upper rail 40 and has a wall surface that is cut and pulled down along the front-back direction DY and the vertical direction DZ. The reinforcement member 90 also has a third wall part 93 that is formed by cutting and pulling up a portion of the first wall part 91 in the vertical direction DZ. The third wall part 93 has a wall surface cut and pulled up along the width direction DX and the vertical direction DZ. The first wall part 91 has an insertion hole 91a into which the first member 81 of the unlocking member 80 described later is inserted. The second wall part 92 has through holes 92a at two different places as seen in the longitudinal direction. The unlocking member 80 is fitted into the through holes 92a. A spring material 84 biasing the unlocking member 80 is attached to the third wall part 93.

An assembly configuration of the unlocking member 80 will be described.

As shown in FIGS. 9(a) to 9(d), in a state where the through hole 92a of the second wall part 92 of the reinforcement member 90 and the axis hole 81a of the first member 81 of the unlocking member 80 overlap together, the axial member 83 is attached so that the first member 81 of the unlocking member 80 is rotatably attached to the second wall part 92. In addition, in a state where the through holes 92a of the second wall part 92 of the reinforcement member 90 and the axis hole 82l) of the second member 82 of the unlocking member 80 overlap together, the axial member 83 is attached so that the second member 82 of the unlocking member 80 is rotatably attached to the second wall part 92. This attachment is made in a state where the first member 81 and the second member 82 of the unlocking member 80 engage with the first engagement portion 81b and the second engagement portion 82c.

As shown in FIGS. 3 and 4, the unlocking member 80 is attached to the upper rail 40 by "attaching the reinforcement member 90 with the unlocking member 80 inside the upper rail 40 by welding or caulking. In this state, the first member 81 of the unlocking member 80 has the other longitudinal end side protruding upward from the insertion hole 45 in the top wall part 41 of the upper rail 40. In addition, the third wall part 93 of the reinforcement member 90 has the third wall part 93 of the reinforcement member 90 protruding upward from the insertion hole 48 in the top wall part 41 of the upper rail 40.

As shown in FIG. 3, the spring material 84 fixed to the third wall part 93 of the reinforcement member 90 is attached to the other longitudinal end side of the first member 81 of the unlocking member 80. The first member 81 of the unlocking member 80 is biased by the spring material 84 forward in the front-back direction DY.

As shown in FIG. 6(a), in a state where the unlocking member 80 is attached to the upper rail 40, the second member 82 of the unlocking member 80 has one longitudinal end side extending from the axis hole 82b along the front-back direction DY. In addition, the second member 82 of the unlocking member 80 has the other longitudinal end side extending from the axis hole 82b forward and obliquely upward in the front-back direction DY of the upper rail 40. The pressing portion 82d at the other longitudinal end of the second member 82 is positioned above the second curved portions 52b of the lock spring 50.

In a state where the unlocking member 80 is attached to the reinforcement member 90 and the reinforcement member 90 with the unlocking member 80 is attached inside the upper rail 40, the unlocking member 80 is arranged in a region sandwiched between the pair of second extension parts 53 of the lock spring 50. That is, the unlocking member 80 is positioned more inside than the lock spring 50 as seen in both the longitudinal direction and the width direction of the upper rail 40. In addition, the unlocking member 80 is positioned to straddle the lock spring 50 as seen in the vertical direction of the upper rail 40. That is, when the upper rail 40 is seen from the width direction DX, the through hole 81d to which the wire 85 of the first member 81 is attached and the pressing portion 82d of the second member 82 are both positioned more upward than the lock spring 50 as seen in the vertical direction DZ. In addition, the axis hole 81a of the first member 81 and the axis hole 82b of the second member 82 are both positioned to overlap the lock spring 50 or positioned more downward than the lock spring 50 as seen in the vertical direction DZ.

An unlocking mechanism by the unlocking member 80 will be described.

As shown in FIGS. 6(a) and 6(b), the first member 81 is rotated in a clockwise direction shown in the drawing around the axis hole 81a by pulling the wire 85 attached to the through hole 81d in the first member 81 of the unlocking member 80 and supported by the wire support tool 49 in a backward direction shown by an arrow. That is, the first member 81 of the unlocking member 80 is displaced in the longitudinal direction of the upper rail 40 and moves backward in the front-back direction DY. Along with this, the first engagement portion 81b of the first member 81 moves to push up the second engagement portion 82c of the second member 82. The displacement in the longitudinal direction of the upper rail 40 does not mean the displacement only in the longitudinal direction of the upper rail 40 but includes the displacement in a direction closer to the front-back direction DY than the vertical direction DZ of the upper rail 40 (for example, a direction of ±45° with respect to the front-back direction DY of 0°.

Figure 7:
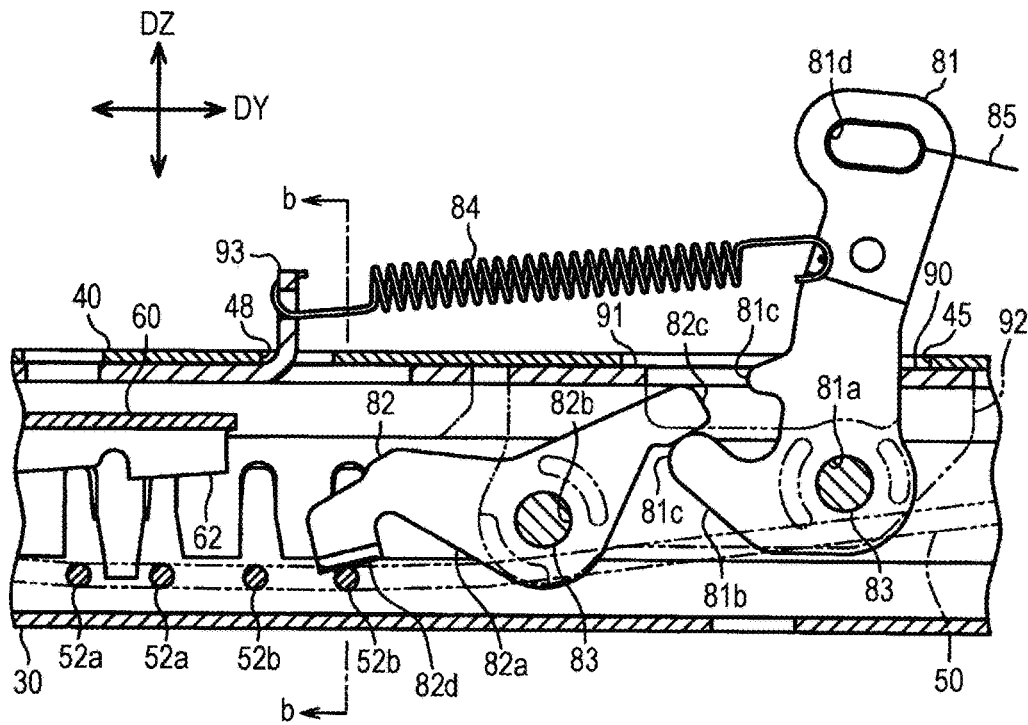
FIG. 7(*a*) is a side view of the unlocking member, and FIG. 7(*b*) is a cross-sectional view of FIG. 7(*a*) taken along line b-b.
Figure 7:
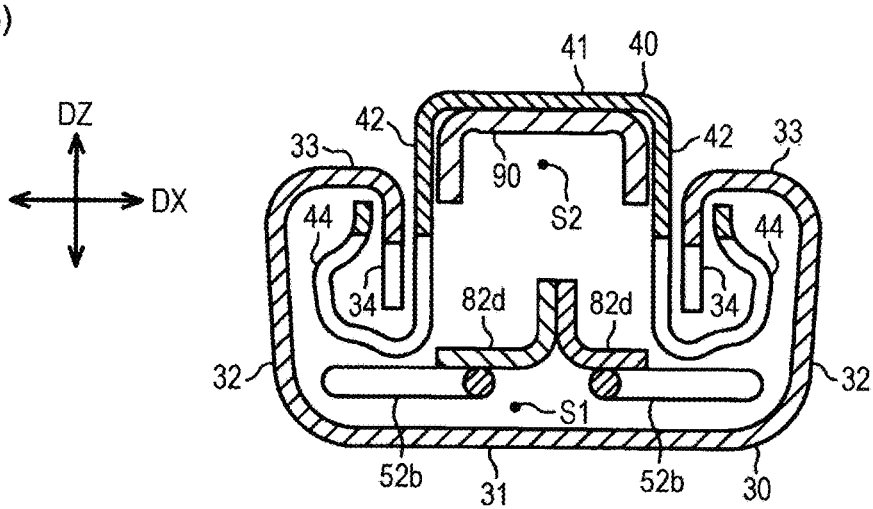
Figure 8A:
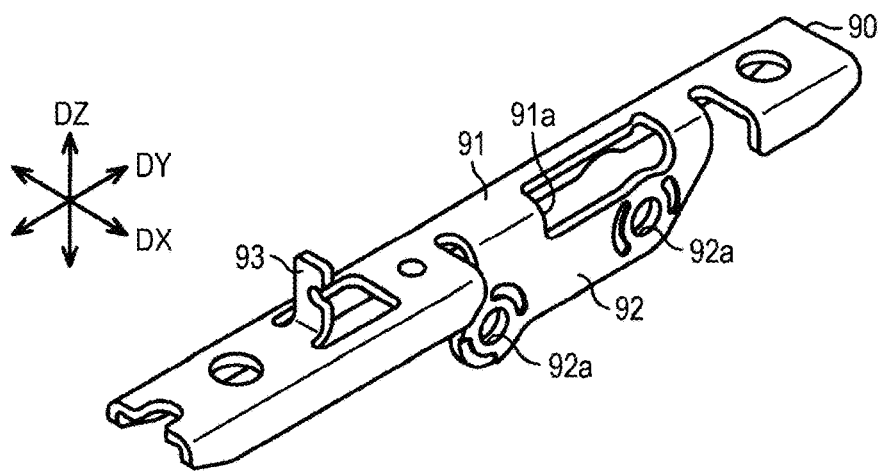
FIG. 8(*a*) is a perspective view of a reinforcement member, FIG. 8(*b*) is a plan view of the same, FIG. 8(*c*) is a side view of the same, and FIG. 8(*d*) is a front view of the same.
Figure 8B:
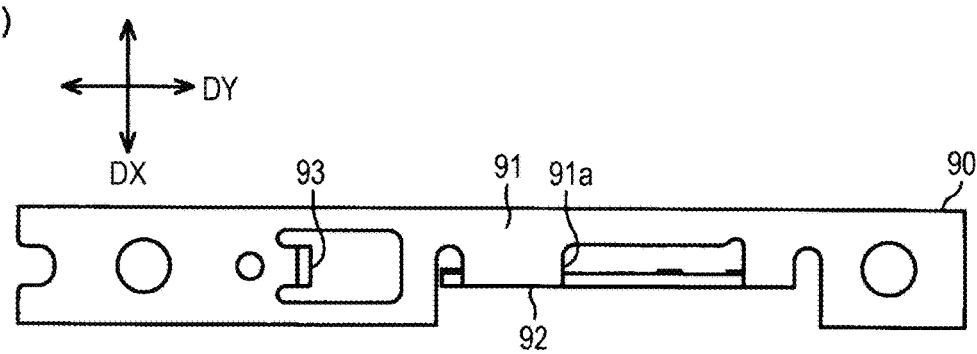
Figure 8C:
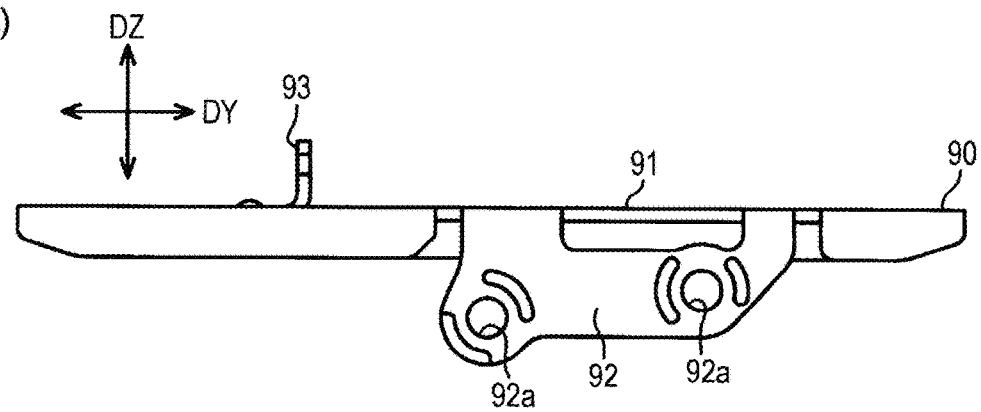
Figure 8D:
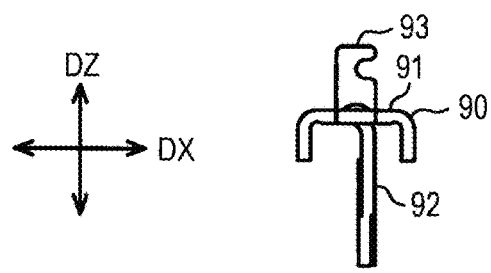
Figure 9A:
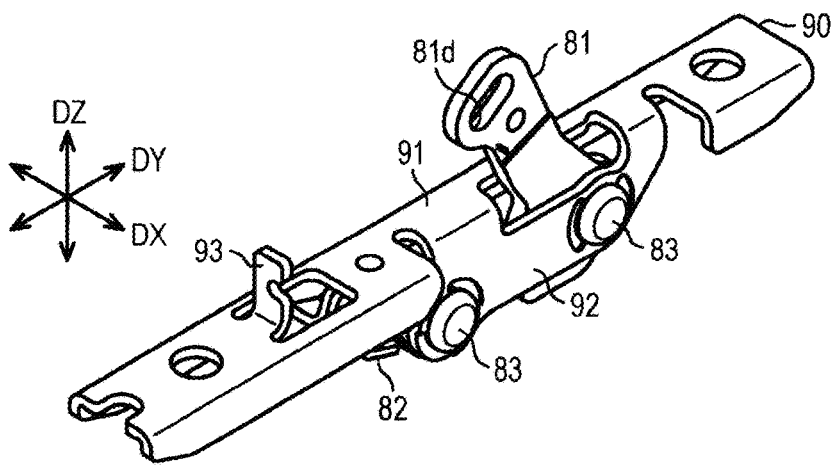
FIG. 9(*a*) is a perspective view of the reinforcement member equipped with the unlocking member, FIG. 9(*b*) is a plan view of the same, FIG. 9(*c*) is a side view of the same, and FIG. 9(*d*) is a front view of the same.
Figure 9B:
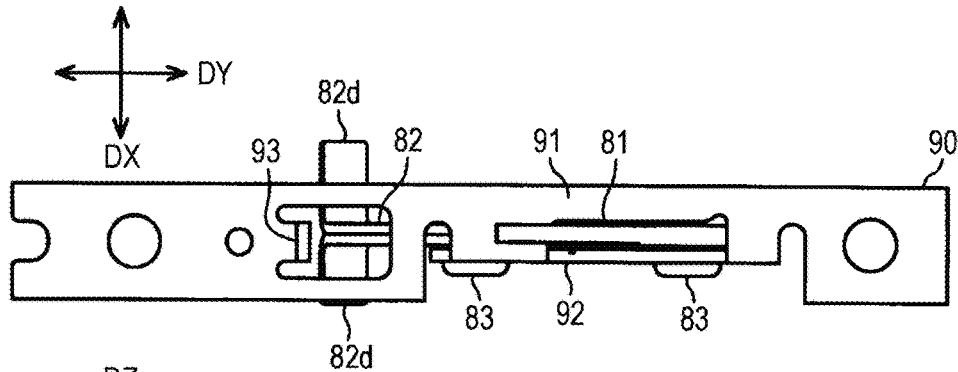
Figure 9C:
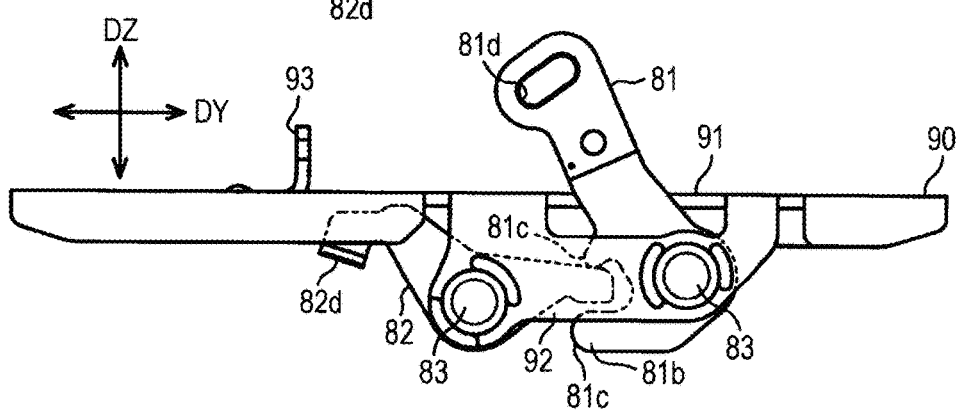
Figure 9D:
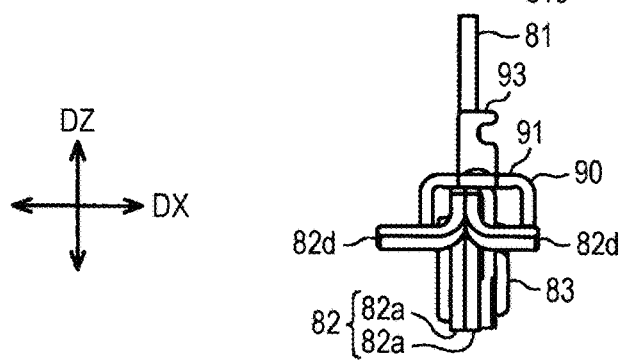

As shown in FIGS. 7(a) and 7(b), when the second engagement portion 82c of the second member 82 of the unlocking member 80 is pushed up, the pressing portion 82d of the second member 82 at the other longitudinal end is displaced downward in the vertical direction DZ, whereby the second curved portions 52b of the lock spring 50 are displaced. When the second curved portions 52b of the lock spring 50 are displaced, the lock spring 50 becomes bent and the curved parts 52 of the lock spring 50 are displaced more downward in the vertical direction DZ than the second cuts 47 of the upper rail 40 and the first cuts 35 of the lower rail 30. Accordingly, the curved parts 52 of the lock spring 50 are disengaged from the second cuts 47 of the upper rail 40 and the first cuts 35 of the lower rail 30 to clear the restriction on the movement of the upper rail 40. The unlocking member 80 can clear the restriction on the movement of the upper rail 40 from the backward side of the vehicle, and thus the unlocking member 80 serves as a backward unlocking member.

Operations and advantageous effects of the present embodiment will be described.

(1) There is provided the unlocking member 80 that displaces the lock spring 50 to disengage the lock spring 50 and the lower rail 30, thereby clearing the restriction on the movement of the upper rail 40. The unlocking member 80 is positioned more inside than the lock spring 50 as seen in both the longitudinal direction and the width direction of the upper rail 40.

The unlocking member 80 is positioned more inside than the lock spring 50 as seen in both the longitudinal direction and the width direction of the upper rail 40, which makes it possible to widen the motion range of the unlocking member 80 taking advantage of the longitudinal space of the upper rail 40. Providing the wide motion range of the unlocking member 80 makes it possible to improve an operational feeling of the unlocking member 80. In addition, the unlocking member can be arranged with efficient use of the internal space of the lock spring.

(2) The unlocking member 80 is positioned to straddle the lock spring 50 as seen in the vertical direction of the upper rail 40. Therefore, it is possible to widen the vertical motion range of the unlocking member 80 necessary for displacement of the lock spring 50. This improves an operational feeling of the unlocking member 80.

(3) The unlocking member 80 is attached more backward as seen in the vehicle front-back direction than the curved parts 52 of the lock spring 50. Therefore, the unlocking member 80 can be efficiently operated from the backward side of the seat 2.

(4) In the lock spring 50, the first separation portions 51*b* of the first extension parts 51 and the second separation portions 53*a* of the second extension parts 53 are in point contact with the side wall parts 42 of the upper rail 40. Therefore, the lock spring 50 can be stably bent when the curved parts 52 of the lock spring 50 are displaced by the unlocking mechanism.

(5) The unlocking member 80 is attached to the reinforcement member 90. Using the reinforcement member 90 attached inside the upper rail 40 as a member for attaching the unlocking member 80 makes it possible to efficiently use the internal space S2 of the upper rail 40.

(6) Operating the lock lever 60 with the loop handle 70 from the forward side of the upper rail 40 makes it possible to clear the restriction on the movement of the upper rail 40. In addition to this, operating the unlocking member 80 from the backward side of the upper rail 40 makes it possible to cancel the restriction on the movement of the upper rail 40. Therefore, the restriction on the movement of the upper rail 40 can be efficiently cleared from both the forward side and backward side of the seat 2.

The present embodiment can be modified in manners described below. The present embodiment and modification examples described below can be combined together without technical conflicts.

Figure 10:
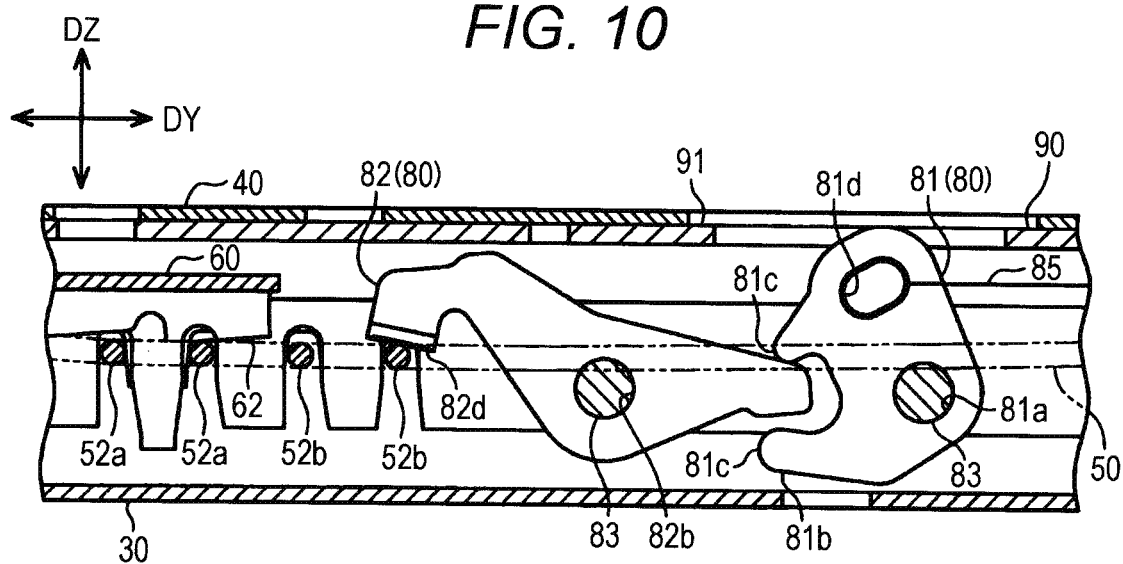
FIG. 10 is a side view of an unlocking member in a modification example.

The first member 81 of the unlocking member 80 may not have the other longitudinal end protruding from the top wall part 41 of the upper rail 40. That is, the unlocking member 80 may be entirely accommodated in the upper rail 40. For example, as illustrated in FIG. 10, the entire first member 81 of the unlocking member 80 may be accommodated in the upper rail 40 and pulled by the wire 85 from the backward side in the upper rail 40. According to this configuration as well, displacing the first member 81 of the unlocking member 80 in the longitudinal direction of the upper rail 40 makes it possible to improve an operational feeling of the unlocking member 80.

Figure 11:
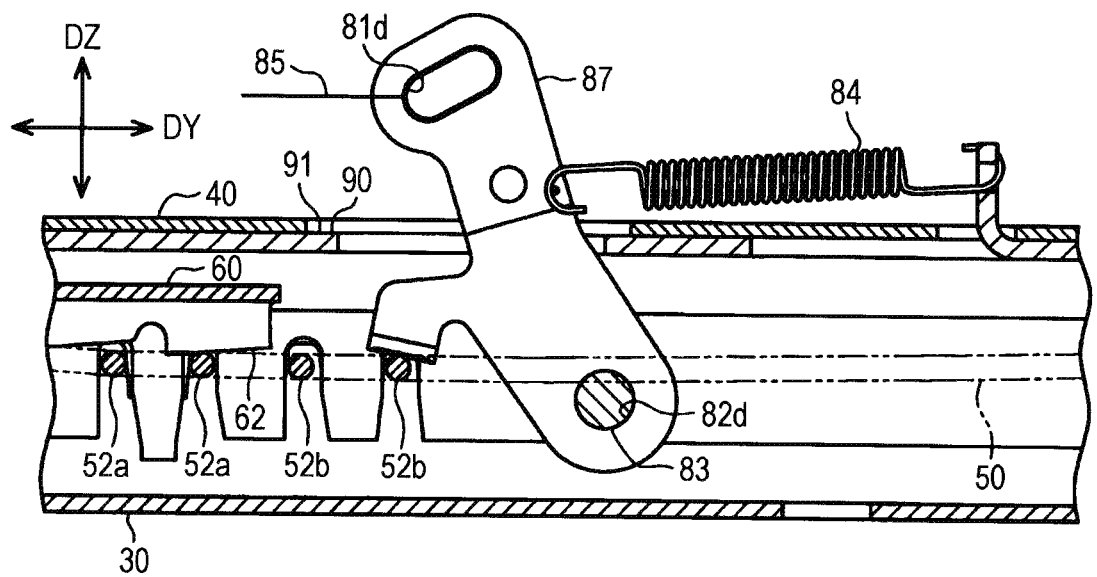
FIG. 11 is a side view of an unlocking member in a modification example.
Figure 12:
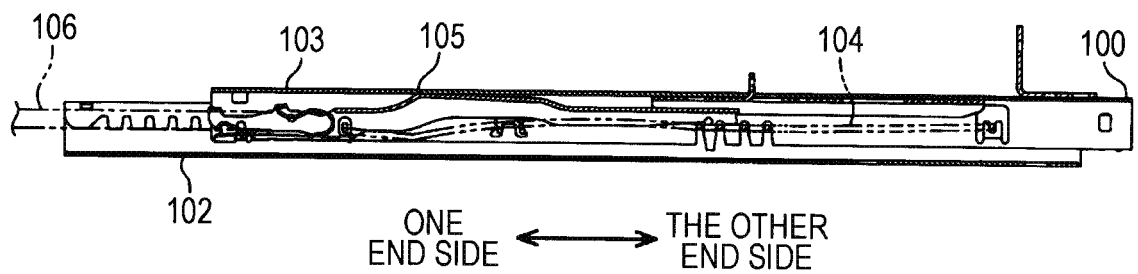
FIG. 12 is a side view of a vehicle seat slide device according to a conventional technique.

The unlocking member 80 is not limited to a mode that is formed by the first member 81 and the second member 82. The unlocking member 80 may be formed by one member or may be formed by three or more members. In a mode in which the unlocking member 80 is formed by one member, an unlocking member 87 may be used as illustrated in FIG. 11, for example. In the unlocking member 87, there are integrated a portion that is pulled by the wire 85 to rotate with a motion range in the longitudinal direction of the upper rail 40 and a portion that displaces the curved parts 52 of the lock spring 50. In this configuration, the curved parts 52 of the lock spring 50 may be displaced by pulling the longitudinal other side of the unlocking member 87 forward in the front-back direction DY of the upper rail 40.

The unlocking member 80 may be provided on the forward side of the upper rail 40 and operated from the forward side of the upper rail 40. That is, the vehicle seat slide device 10 may not include the lock lever 60 but may be unlocked by the unlocking member 80 instead of the lock lever 60. In this case, the unlocking member 80 may be provided at two forward and backward places of the upper rail 40.

In a mode in which the unlocking member 80 is positioned to straddle the lock spring 50 as seen in the vertical direction of the upper rail 40, both the axis hole 81*a* of the first member 81 and the axis hole 82*b* of the second member 82 may be positioned more upward than the lock spring 50 as seen in the vertical direction DZ.

The unlocking member 80 may not be positioned to straddle the lock spring 50 as seen in the vertical direction DZ of the upper rail 40. That is, the unlocking member 80 may be attached more upward than the lock spring 50 as seen in the vertical direction DZ of the upper rail 40.

The unlocking member 80 may be attached to a member other than the reinforcement member 90. The unlocking member 80 may be attached to a member that is different from the reinforcement member 90 and attached inside the upper rail 40. The unlocking member 80 may be attached to a member that is attached outside the upper rail 40. The unlocking member 80 may be directly attached to the upper rail 40.

A method for attaching the reinforcement member 90 to the upper rail 40 is not limited to welding and caulking. The reinforcement member 90 may be screwed into the upper rail 40.

In the present embodiment, the lock spring 50 is formed in an opened annular shape with a gap between the bent portions 51*a*. However, the lock spring 50 is not limited to this mode. The lock spring 50 may be formed such that the bent portions 51*a* are in contact with each other with no gap therebetween. The lock spring 50 may be formed in a closed annular shape in which the bent portions 51*a* are connected together.

In the present embodiment, the longitudinal direction of the upper rail 40 and the lower rail 30 aligns with the front-back direction DY of the vehicle. However, the longitudinal direction of the upper rail 40 and the lower rail 30 is not limited to this but may align with the width direction DX of the vehicle.

This international patent application is filed to claim for priority based on Japanese Patent Application No. 2017-251710 filed on Dec. 27, 2017. The entire disclosure of Japanese Patent Application No. 2017-251710 is incorporated herein by reference.

The foregoing description of the specific embodiment of the present invention is provided for the purpose of exemplification. This description is not intended to be all-inclusive or limit the present invention to the above-described modes. It is obvious for those skilled in the art that a large number of modifications and changes are allowed in light of the foregoing description.

LIST OF REFERENCE NUMERALS

10 Vehicle seat slide device
2 Seat

30 Lower rail
40 Upper rail
50 Lock spring
80 Unlocking member

The invention claimed is:

1. A vehicle seat slide device comprising:
a lower rail;
an upper rail that is movably attached to the lower rail and supports a seat;
a lock spring that is attached to the upper rail, has a lock part engaging with the lower rail to restrict movement of the upper rail, and is formed in an annular shape; and
an unlocking member that is attached to the upper rail and displaces the lock spring to disengage the lock spring and the lower rail to clear the restriction on the movement of the upper rail, wherein
the unlocking member is positioned more inside than the lock spring as seen in both a longitudinal direction and a width direction of the upper rail, and
the unlocking member extends upwards and downwards from a portion of the unlocking member between two portions of the lock spring in the width direction of the upper rail.

2. The vehicle seat slide device according to claim 1, wherein the unlocking member is attached more backward than the lock part of the lock spring as seen in a front-back direction of the vehicle.

3. The vehicle seat slide device according to claim 1, wherein the unlocking member comprises:
a first member having a convex portion and rotatable about a first axis; and
a second member having an engagement portion engageable by the convex portion and rotatable about a second axis different from the first axis.

* * * * *